United States Patent [19]

Minotti

[11] Patent Number: 4,884,524

[45] Date of Patent: Dec. 5, 1989

[54] VEHICLE DISTRESS SIGNAL

[76] Inventor: Peter L. Minotti, R.D. #1, Easton, Pa. 18042

[21] Appl. No.: 260,460

[22] Filed: Oct. 20, 1988

[51] Int. Cl.⁴ .............................................. B60Q 1/00
[52] U.S. Cl. ................................. 116/28 R; 116/173
[58] Field of Search ............... 116/28 R, 30, 173, 174, 116/175, 62.4, 200, 209; 40/129, 591, 204, 208, 318; 248/497, 539; 73/188, 189

[56] References Cited

U.S. PATENT DOCUMENTS

| | | | |
|---|---|---|---|
| 2,420,772 | 5/1947 | Dalton | 116/28 R |
| 2,581,549 | 1/1952 | McGaugh | 116/28 R |
| 3,024,552 | 3/1962 | MacLea | 116/28 R |
| 3,933,117 | 1/1976 | Maietta | 116/28 |
| 3,936,967 | 2/1976 | Davis | 40/129 |
| 4,002,138 | 11/1977 | Dobala | 116/173 |
| 4,015,557 | 4/1977 | Schulein | 116/173 |
| 4,144,833 | 3/1979 | Newmann, Sr. | 116/173 |
| 4,163,426 | 8/1979 | O'Neill | 116/28 R |
| 4,348,978 | 9/1982 | Brucato | 116/28 R |
| 4,417,873 | 9/1984 | Thomas | 116/28 R |
| 4,518,925 | 6/1979 | Gagnon | 40/591 |
| 4,582,017 | 4/1986 | Ostermiller | 116/28 R |
| 4,633,215 | 12/1986 | Anders et al. | 116/28 R |
| 4,700,655 | 10/1987 | Kirby | 116/174 |

FOREIGN PATENT DOCUMENTS

| | | | |
|---|---|---|---|
| 3306686 | 8/1984 | Fed. Rep. of Germany | 116/28 R |
| 510818 | of 1955 | Italy | 116/29 R |
| 1196565 | 5/1959 | Italy | 116/28 R |
| 240474 | 11/1984 | Japan | 116/30 |

Primary Examiner—William A. Cuchlinski, Jr.
Assistant Examiner—Jeffrey J. Hohenshell
Attorney, Agent, or Firm—John Lezdey

[57] ABSTRACT

A vehicle distress signal includes a rigid banner which has attention attraction coatings or lights on the banner's surfaces. The signal is attached to a vehicle door or window at one end of the banner by a combination clamp and spacer. The clamp overfits the edge of a door of a vehicle and the spacer holds the banner away from the door in a plane perpendicular to the door, so that when the clamp is placed over the edge of a door and the door is closed, the distress signal is held firmly to the vehicle with the banner's attention attraction surfaces facing approaching traffic.

10 Claims, 1 Drawing Sheet

VEHICLE DISTRESS SIGNAL

BACKGROUND OF THE INVENTION

1. Field of the Invention

This invention relates to a safety device for use by motorists to signal for assistance or distress while remaining safely within their automobiles, and particularly to a vehicle distress signal readily secured on the door or window of a vehicle and having light reflective or light producing means to catch the attention of approaching motorists.

2. Description of the Prior Art

Heretofor, distress warning and signalling devices for use in vehicles have been either very complex to use or have been attached to the vehicle by means which are easily dislodged during storms or wet weather.

Travel on interstate highways requires that automobiles travel at a relatively high rate of speed. It is often necessary that the driver of a vehicle on such a highway be alert for unexpected occurrences on the roadway ahead. One type of unexpected occurrence is the disabled vehicle along the side of the highway, or in some cases, in the middle of the high speed lane of the roadway. It is not always possible for the driver of an oncoming vehicle to discern whether the vehicle on the shoulder is moving or standing still, until he realizes that he is approaching the vehicle at a relatively fast closing rate. Thus, he is forced to maneuver at the last minute, since he could not determine the state of the vehicle in time for a judicious lane change. Also, at high rates of speed, it is difficult for the passing motorist to tell whether the driver of the stopped vehicle is merely resting or in need of help. Therefore, it would be desirable to have a distress warning device which unmistakably indicates to oncoming traffic that a distress condition exists, so that such oncoming traffic can have sufficient time to take corrective action and obtain help when necessary.

There have been various devices used to warn upcoming traffic of a stopped vehicle, among these are flares and flags which are posted on the roadway. Not only do flares have a limited duration of burn, but both flags and flares require that the motorist leave his vehicle and place the warning device on a dark higway.

Some devices have been developed which are positioned on the horizontal surface of a vehicle (i.e., the roof, trunk or hood) in the line of eight of oncoming traffic. Among these are U.S. Pat. Nos. 4,700,655 to Kirby; 4,158,925 to Gagnon; 3,936,967 to Davis; and 3,933,117 to Maietta. All of the these patents disclose devices which fasten to a vehicle hood, roof or side by means of a suction cap base. It is well know that the accumulated dirt and grease (such as is commonly accummualted during driving on a highway) impedes the holding power of suction cup devices. Also, during rain, snow or wind storms, the suction cup may not hold to the vehicle.

Other patents have disclosed devices which attach to a car by means of a bent rod which slips over the top edge of a vehicle window. U.S. Pat. No. 4,163,426 to O'Neill discloses a highway safety device which is mounted on the window of a vehicle and has a flag extending upward from the base. At the tip of the flag pole is a flasher light which operates from the cigarette lighter. U.S. Pat. No. 4,002,138 to Dobala discloses a flag with a pocket to hold a flag pole which slides over the vehicle window.

Heretofor, there has been no vehicle distress signal that includes features for taking advantage of the lights of oncoming vehicle and which incorporates lighting features of sufficient intensity to catch the attention of a passing motorist in full time for him to make a defensive move and to determine the degree of distress of the hehicle and occupants.

SUMMARY OF THE DISCLOSURE

The aforementioned prior art problems are obviated by the vehicle distress signal of this invention in which an banner with attention getting means and/or surface lights is held unmovingly to a vehicle at the vehicle door or window. The banner may be coated with glitter, chipped glass, or reflective paint to catch the attention of passing motorists, even at night or in poor weather. The banner is held to the door or window by clamp means, preferably a hook-shaped pressure clamp or pinch clamp which overfits the edge of the door or window and is held, unmoving, when the door is shut. A spacer is provided to position the banner away from the door or window and perpendicular to the door or window so that each side of the banner faces oncoming traffic. In an alternative embodiment, flexible fringe means may be added to the periphery of the banner so that the waving fringe will get the attention of approaching motorists. Another alternative embodiment includes providing a plurality of lights on the signal banner itself and operable from the cigarette lighter of the vehicle and/or by a separate electrical energy source.

More particularly, the invention relates to a vehicle distress signal having a banner with two surfaces and attention attraction means on at least one surface. Vehicle attachment means are provided at one end of the banner for attaching the banner to a vehicle at the vehicle door or window. The attachment means includes an intergral rigid spacer means and a clamping means. The spacer means holds the banner away from the door or window in a plane perpendicular to the door or window so that when the clamp is placed over the edge of a door or window and the door is closed, the signal is held firmly to the vehicle with the banner surface having attention attraction means facing approaching traffic. Advantageously, the banner of the invention is proivded with flexible fringe means on the periphery of the banner, the fringe being movable by air motion and being light reflective. For better visibility at night, the banner may also include a plurality of lights visiible on at least one surface of the banner and means connecting the lights to an electrical energy source. For increased visibility at dusk or in daylight, the banner bay be coated with one or more light reflecting coatings such as luminescent paint, glitter, and the like.

It is, therefore, an object of this invention to provide a vehicle distress signal which is clearly visible in both daylight and darkness.

It is also an object of this invention to provide a vehicle distress signal which employs light reflective paint, glass or glitter to atract the attention of passing motorists.

It is another object of this invention to provide a vehicle distress signal which includes a series of lights which are operable through the vehicle's cigarette lighter.

It is still a further object of this invention to provide a vehicle distress signal which is mountable on substantially all models and makes of automobile, both foreign and domestic.

It is yet another object of this invention to provide a vehicle distress signal in which the banner is rigid and is held perpendicularly away from the vehicle's side to be fully visible to motorists passing in both directions.

It is still another object of this invention to provide a vehicle distress signal of rugged and durable construction and having few parts and which, therefore, may be inexpensively and easily manufactured and simple to use.

It is still a further object of this invention to provide a vehicle distress signal which may display a variety of indicia to indicate what kind of help is required.

These and other objects will be more readily ascertainable to one skilled in the art from a consideration of the following figures, description and exemplary embodiments, with the understanding that the drawings are illustrative only and that changes may be made in the specific construction illustrated and described within the scope of the appended claims.

BRIEF DESCRIPTION OF THE DRAWING(S)

DETAILED DESCRIPTION OF THE PREFERRED EMBODIMENT(S)

Figure 1:
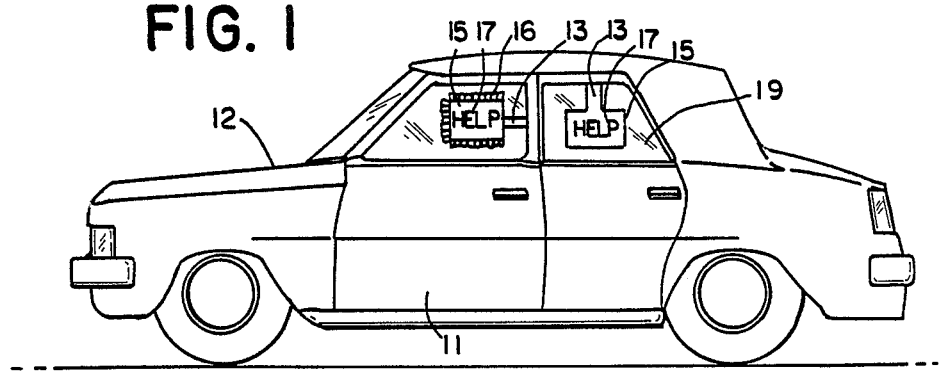
FIG. 1 is a side elevation view of a vehicle with one distress signal of this invention positioend on a door and one on a window.

Referring now to the drawings, and more particularly to FIG. 1, automobile 12 is shown with distress signal 10 positioned on door 11. Distress signal 10 is illustrated with the message 17, "HELP", on banner 15, but it should be understood that a variety of messages would be suitable. Help, Get Help, Out of Gas, Flat Tire, etc. would all be suitable, as long as they are presented in large enough letters to be easily read by a person in a passing vehicle. Banner 15 is sized so that the message is visible from a distance. Spacer 13 is visible between door 11 and banner 15 and is integral with clamp 14 (shown in FIGS. 2A and 2B).

Figure 2A:
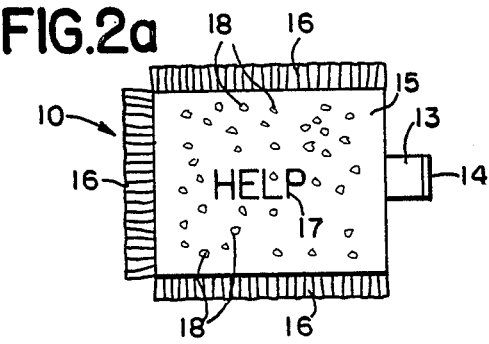
FIG. 2A is a front view of the distress signal with peripheral fringe.
Figure 2B:
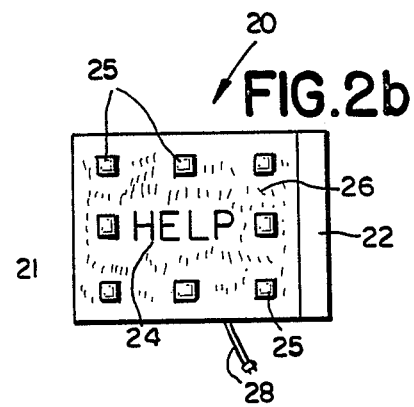
FIG. 2B is a top view of the clamp and spacer of the distress signal.

Now referring to FIGS. 2A and 2B, distress signal 10 is seen to have banner 15 with message 17, peripheral fringe means 16 and light reflective coating 18. Banner 15 is attached to a vehicle by clamp 14 which is integral with spacer 13. Spacer 13 may be joined or integral at one end to banner 15. At the other end, spacer 13 may be joined or integral to clamp 14. Clamp 14 may be hook-shaped and preferably is flexible enough that the span of the hook will overfit any conventional vehicle door edge and be held by clamping pressure thereto. Alternatively, clamp 14 may comprise a pinching clamp. Spacer 13 is of a length that places banner 15 at a sufficient distance from the door of a vehicle that the shape of the door or protrusions on the vehicle will not interfere with the clear visibility of the banner. FIG. 2A illustrates an embodiment with fringe means 16. Preferably fringe 16, which is a flexible ribbon(s) or strip(s), will be highly light reflective or iridescent, either by means of reflective paint or coating or fabric characteristic Its ability to move in the wind is an important attention attraction feature.

Figure 3:
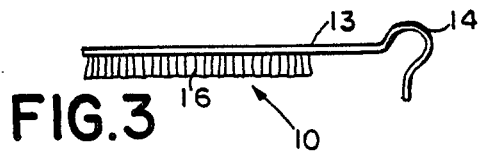
FIG. 3 is a front view of the distress signal with lights.

Now referring to FIG. 3, an alternative embodiment of the invention is shown as vehicle distress signal 20. Signal 20 has banner 21 with message 24 and a plurality of lights 25 around its periphery. The lights are visible from both faces of banner 21 and are preferably of sufficient intensity to be highly visible from a distance. Lights 25 may comprise ordinary bulbs in series or parallel or fiber optics. Lights 25 are preferably operable from the cigarette lighter of a vehicle through plug 28. For additional sparkle and greater visibility in daylight, banner 21 also has sequins or glitter 26 to reflect the light of lights 25, the lights from oncoming vehicles or sunlight. Banner 21 is held to the automobile by attachment means 22 which comprise a pressure clamp or pinch clamp.

Figure 4:
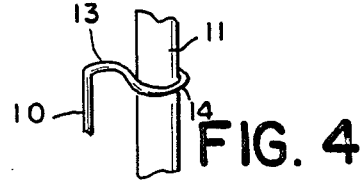
FIG. 4 is a cross section of portion of a hehicle door with a distress signal clamp overfitting the door.

Now referring to FIG. 4, distress signal 10 is seen in place with clamp 14 overfitting the edge of door 11. Spacer 13 is seen to hold signal 10 away from the door surface and perpendicular to the door, facing on-coming traffic from both directions.

There are several variations which can be practiced in the scope of this invention. Light reflective and/or iridescent coatings on the banners may be reflective paint, glitter, chips of glass, sequins or the like. The banners may have a variety of messages. The banners may include operable lights which operate with power from the vehicle's battery through the cigarette lighter, but a battery power pack is within the scope of this invention.

The shape of the banner may comprise any shape, i.e. square, rectangular, diamond, round, etc. The fringe means may comprise one or more ribbons or strips of flexible material in any desirable length.

There are many advantages to the vehicle distress signal of this invention. Chiefly, a highly visible signal is easily attached to the vehicle without the driver leaving the vehicle. The many light reflective coatings and additions to the banner make the signal visible and attention attracting in daylight, twilight and at night.

Having now illustrated and described my invention, it is not intended that such description limit this invention, but rather that this invention be limited only by reasonable interpretation of the appended claims.

I claim:

1. A vehicle distress signal comprising:
   a flexible banner having two surfaces, said banner having a plurality of lights visible on at least one surface and means for connecting said lights to an electrical energy source so that said banner is visible at night; and
   vehicle attachment means at one end of said banner for attaching said banner to a vehicle at the vehicle door or window, said attachment means including an integral rigid spacer means and a clamping means, and said spacer means holding said banner away from said door, so that when said clamping means is placed over the edge of a door and the door is closed, said signal is held firmly to the vehicle with said banner surface having attention attraction means facing approaching traffic.

2. The vehicle distress signal according to claim 1, wherein said banner further comprises flexible fringe means on the periphery of said banner, said fringe being movable by air motion and being light reflective.

3. The vehicle distress signal according to claim 1 wherein said lights comprise fiber optical means.

4. The vehicle distress signal according to claim 1, wherein said banner further comprises a coating on both banner surfaces, said coating including light reflective particles.

5. The vehicle distress signal according to claim 4, wherein said light reflective particles are sequins or glass.

6. The vehicle distress signal according to claim 1, wherein said attention attraction means includes a message means.

7. The vehicle distress signal according to claim 1, wherein said attention attraction means is on two surfaces.

8. The vehicle distress signal according to claim 1, wherein said clamping means is generally hook-shaped with a span predetermined to overfit the edge of a door or window of a vehicle.

9. A vehicle distress signal comprising:
a flexible banner having two surfaces;
attention attraction means being provided on at least one of said surfaces, said attention attraction means comprising a plurality of light means on at least one of said surfaces means for connecting said plurality of right means to an electrical energy source, light reflective means distributed about said surface, and message means;
clamp means at one end of said banner for attaching said banner to a vehicle at the vehicle door; and
means for supplying electrical energy for activating said light means.

10. The vehicle distress signal according to claim 9, wherein said attention attraction means is on two surfaces.

* * * * *